United States Patent [19]

Brown

[11] 4,331,263

[45] May 25, 1982

[54] CONTROL UNIT FOR USE IN A VIBRATORY FEEDER SYSTEM

[75] Inventor: George J. Brown, Capistrano Beach, Calif.

[73] Assignee: Christopher Scientific Co., Inc., Anaheim, Calif.

[21] Appl. No.: 98,828

[22] Filed: Nov. 30, 1979

[51] Int. Cl.³ .................... B65G 27/24; H02K 33/00
[52] U.S. Cl. .................... 222/63; 198/769; 318/132; 318/133
[58] Field of Search .................. 222/63; 198/761, 762, 198/769; 318/127, 128, 132, 133

[56] References Cited

U.S. PATENT DOCUMENTS

| | | | |
|---|---|---|---|
| 2,287,223 | 6/1942 | Baird | 318/128 |
| 2,287,406 | 6/1942 | Baird | 318/127 |
| 2,322,217 | 6/1943 | Baird | 318/128 |
| 3,135,426 | 6/1964 | Müller et al. | 222/55 |
| 3,342,225 | 9/1967 | Blodgett | 141/1 |
| 3,372,793 | 3/1968 | Redford et al. | 198/763 |
| 3,434,586 | 3/1969 | Morris | 198/762 |
| 3,447,051 | 5/1969 | Attwood et al. | 318/127 |
| 3,470,438 | 9/1969 | Krauer et al. | 318/312 |
| 3,477,281 | 11/1969 | Helmuth | 73/71.6 |
| 3,716,130 | 2/1973 | Morris | 198/762 |
| 3,748,553 | 7/1973 | Reiner | 318/128 |
| 3,922,589 | 11/1975 | Peckingham | 318/126 |
| 3,924,730 | 12/1975 | Brown | 198/761 |
| 4,002,270 | 1/1977 | Reiner | 222/58 |
| 4,038,588 | 7/1977 | Woolfson et al. | 318/648 |
| 4,049,997 | 9/1977 | McGhee | 318/128 |
| 4,090,112 | 5/1978 | Selverstone | 318/128 |
| 4,101,816 | 7/1978 | Shepter | 318/128 X |
| 4,177,434 | 12/1979 | Ida | 318/128 X |
| 4,216,416 | 8/1980 | Grace | 198/762 X |

OTHER PUBLICATIONS

*Basic Electrical Engineering*, by E. A. Fitzgerald, ScD. Chapter 7, pp. 148-150, McGraw-Hill Book Company, Inc. (1945).

Primary Examiner—David A. Scherbel
Assistant Examiner—Edward M. Wacyra
Attorney, Agent, or Firm—Jackson, Jones & Price

[57] ABSTRACT

A control unit for controlling a vibratory bowl feeder which is effective to maintain, for varying feeder loads, a constant preselected amplitude of bowl feeder vibration at a vibratory frequency which coincides with the changing mechanical resonant frequency of the feeder system. The control unit includes a sensor which detects the amplitude and frequency of feeder bowl vibration, a frequency control loop and an amplitude control loop. The frequency control loop is responsive to the detected frequency of vibration and provides an oscillating signal which coincides with the resonant frequency of the system. The amplitude control loop is responsive to the detected amplitude of vibration and includes a variable gain amplifier which amplifies the oscillating signal to provide a feeder driving signal which causes the feeder to vibrate at the system resonant frequency at a preselected amplitude. The sensor for detecting amplitude and frequency of the bowl vibration is preferably a device for sensing the third harmonic of the drive current in the electromagnetic drive of the system. A variable capacitive reactance coupling circuit between the power drive amplifier as the electromagnetic drive of the system is set to match the inductive reactance of the electromagnetic drive.

21 Claims, 8 Drawing Figures

CONTROL UNIT FOR USE IN A VIBRATORY FEEDER SYSTEM

BACKGROUND OF THE INVENTION

1. Field of the Invention

The present invention relates generally to electronic control units and more particularly, to an electronic control unit for use in a vibratory feeder system.

2. Prior Art

In the automatic assembly of complex mechanisms, the feeding of parts to assembly devices is usually carried out by means of vibratory feeders. Such feeders are also used for dispensing small parts of quantities of powders or the like to packaging or dispensing machines.

Vibratory feeders are generally either (i) linear moving feed mechanisms or (ii) bowl-shape feeders which vibrate about an axis along the centerline of a feeder bowl which carries the product to be dispensed. Feeder bowls typically include an inclined ramp located along the inside circumference of the bowl which spirals from the bottom portion of the bowl to the bowl top. An electromagnetic drive device is provided for vibrating the bowl about the bowl centerline thereby causing the product at the bottom of the bowl to slowly travel up the inclined ramp to a guiding chute which guides the product from the periphery of the bowl to one or more assembly stations.

The bowl feeder is typically resiliently supported by a number of springs, the lower ends of which are attached to a heavy base which is in turn supported by cushioned feet. Flat springs whose longitudinal axis lies approximately 15° C. off the vertical are commonly used. The feed bowl is secured to the upper ends of the springs, with the electromagnetic drive device being positioned between and coupled to the rigid base and the resiliently mounted bowl.

In common practice, the electromagnetic drive device is driven directly by a 115 volt A.C. line with the line frequency being either 50 Hz or 60 Hz. The drive device will accordingly deliver drive pulses to the bowl at twice the line frequency, i.e., either 100 Hz or 120 Hz. If the frequency of the driving force is largely different from the resonant frequency of the mechanical system being driven, the magnitude of displacement will be minimal. Accordingly, it is desirable to drive the bowl at the resonant frequency of the mechanical system in order to maximize the movement of the bowl for a given driving force. The current practice has been to manually tune the mass-spring relationship of the feeder system so that the mechanical resonant frequency matches the drive frequency.

The prior art feed control systems possess several shortcomings. By way of example, any change in the mass of the mechanical system causes a shift in the resonant frequency of the feeder system. Mass changes occur, of course, as the product is delivered to the guide chute and when the feed-bowl is refilled. Inasmuch as the drive frequency no longer coincides with the shifted system resonant frequency, the amplitude of bowl vibration will be reduced thereby causing an undesireable decrease in feed rate of the product.

One method currently used to overcome the limitations in the prior art systems is to carefully manually adjust the mechanical system so that load changes cause a minimal shift from the natural frequency of the system. This technique requires considerable skill, is time-consuming and is not always effective.

A second technique currently used is to insert a variable transformer between the electromagnetic drive and the line source. As the resonant frequency of the feed system shifts, an operator changes the drive voltage by manually adjusting the variable transformer so as to maintain a constant product feed rate. This technique is disadvantageous in that an operator must continually monitor the feed rate and make the necessary corrections in drive voltage not only to compensate for changes in the bowl mass, but also to compensate for changes in line voltage and temperature. Moreover, any significant mismatch between the system resonant frequency and the drive frequency necessitates a substantial increase in drive power in order to maintain a constant feed rate. The increased power requirement causes a wasteful expenditure of energy and may result in overheating of the system Another technique which is sometimes used to overcome the deficiencies in the prior art vibrator control systems is to power the electromagnetic driver from a power source which has provisions for manual adjustment of the drive frequency. Again, this technique requires the constant attention of an operator. Furthermore, the output voltage of available variable frequency power sources typically varies with the input line voltage, thus necessitating further adjustments by the operator.

Some prior art systems utilize a feedback device mounted on the feed bowl which is used in conjunction with appropriate control circuitry for controlling the drive rate of the system in order to maintain a constant feed rate. Such systems do not have variable frequency control. Accordingly, large shifts in resonance necessitates large increases in drive power which result in energy wastage and possible overheating.

Prior art vibrator control and related systems are disclosed in U.S. Pat. No. 3,447,051 issued to Attwood et al,; U.S. Pat. No 3,716,130 issued to Morris; U.S. Pat. No. 4,002,270 issued to Reiner and U.S. Pat. No. 4,038,558 issued to Woolfson et al. While such systems overcome some of the aforementioned deficiencies, serious limitations remain.

The present invention overcomes the limitations inherent in prior art vibrator feeder control systems by providing a control unit which automatically adjusts the frequency and/or the magnitude of the electromagnetic device drive voltage to compensate for changes in feeder loading and the like. The control unit of the present invention is reliable, does not require the constant attention of an operator, and is not affected by variations in temperature, line voltage or line frequency.

SUMMARY OF THE INVENTION

A control unit for controlling a vibratory bowl feeder is disclosed. The control unit is effective to maintain, for varying feeder bowl loads, a constant preselected amplitude of bowl feeder vibration at a vibratory frequency which coincides with the mechanical resonant frequency of the feeder system.

The control unit includes a sensor which produces an A.C. signal having a frequency and amplitude which is proportional to the frequency and amplitude of the feeder bowl vibration, a frequency control loop and an amplitude control loop. The frequency control loop includes an adjustable phase shifting circuit, which shifts the phase of the A.C. sensor signal, followed by a phase-locked loop which generates an oscillatory signal in phase with the phase-shifted sensor signal.

The amplitude control loop includes a precision rectifier followed by a lowpass filter which converts the A.C. sensor signal to a D.C. signal having an amplitude which is proportional to the feeder bowl amplitude of vibration. The loop further includes a variable gain amplifier which amplifies the oscillatory signal at a gain determined by the magnitude of the D.C. signal. The variable gain amplifier is followed by a power drive amplifier, having a gain which may be manually selected, which drives a voltage step-up transformer. The output of the transformer is coupled to the electromagnetic drive of the vibratory feeder.

On operation, the digital phase shifter is initially adjusted so the oscillator signal generated by the phase-locked loop coincides with the mechanical resonant frequency of the feeder system. A change in feeder load will cause a change in the resonant frequency of the system and a corresponding phase shift in the A.C. sensor signal. Such phase shift will be detected by the phase-locked loop which will, in response to the shift, change the frequency of the oscillator signal and, hence, the frequency of the drive signal to coincide with the new feeder system resonant frequency. In addition, any change in feeder load will cause a resultant change in the magnitude of the D.C. signal controlling the variable gain amplifier. The gain of the amplifier will shift to compensate for the load change thereby maintaining a constant preselected amplitude of feeder bowl vibration.

Rather than using a separate sense coil to detect the frequency and amplitude of the feeder bowl vibrator, the third harmonic of the drive signal in the electromagnetic drive is sensed. This signal is proportional to the frequency and amplitude of the feeder bowl vibration.

To enhance the voltage output of the driver operational amplifier, a manually selectable capacitive reactance is placed in series with the electromagnetic drive of the feeder. The capacitive reactance is adjusted to be equal to the inductive reactance of the electromagnetic drive.

BRIEF DESCRIPTION OF THE DRAWINGS

FIG. 6 is a schematic diagram showing further circuit details of the power amplifier.

DETAILED DESCRIPTION OF THE INVENTION

Figure 1:
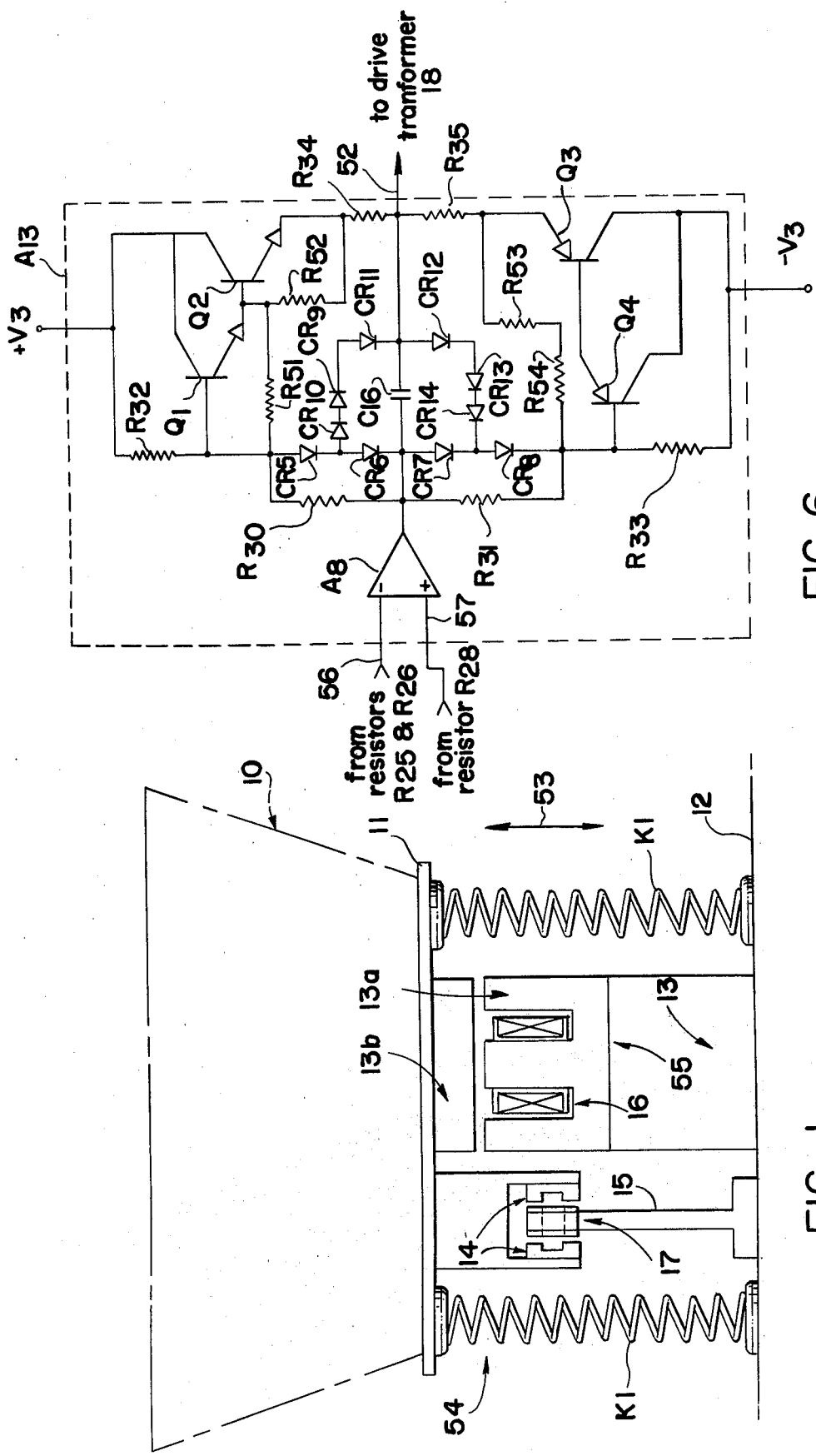
FIG. 1 is a simplified schematic representation of an exemplary vibrator feeder which may be used in conjunction with the subject control unit.

Referring now to the drawings, a simplified schematic diagram of a typical vibratory bowl feeder such as may be used in conjunction with the subject control unit, may be seen in FIG. 1. The bowl feeder includes a product receiving receptical in the form of bowl (shown in phantom) 10 which is secured to a top platform or plate 11 of the bowl feeder base unit, such unit being generally indicated by the numeral 54. Base unit 54 includes a rigid base 12 which typically rests on rubber isolation pads (not shown). Platform 11 is resiliently supported above the base 12 by way of a plurality of springs represented schematically by spring members K1 and K2. Means are provided (not shown) for limiting movement of platform 11 in a vertical direction as indicated by arrow 53.

Platform 11 is reciprocated by means of an electromagnetic drive generally indicated by the numeral 55. Drive unit 55 includes an E-shaped armature of magnetically permeable material 13A whose center leg supports drive coil 16. It is attached to base 12 by means of support 13. Armature 13B of similar material is mounted to platform 11. A vertical support rod 15, secured to base 12, carries a sensing coil 17 located between the poles of a pair of C-shaped magnets 14. The leads (not shown) at both coils are connected to the subject vibratory device control unit which is located in a separate housing.

Figure 2:
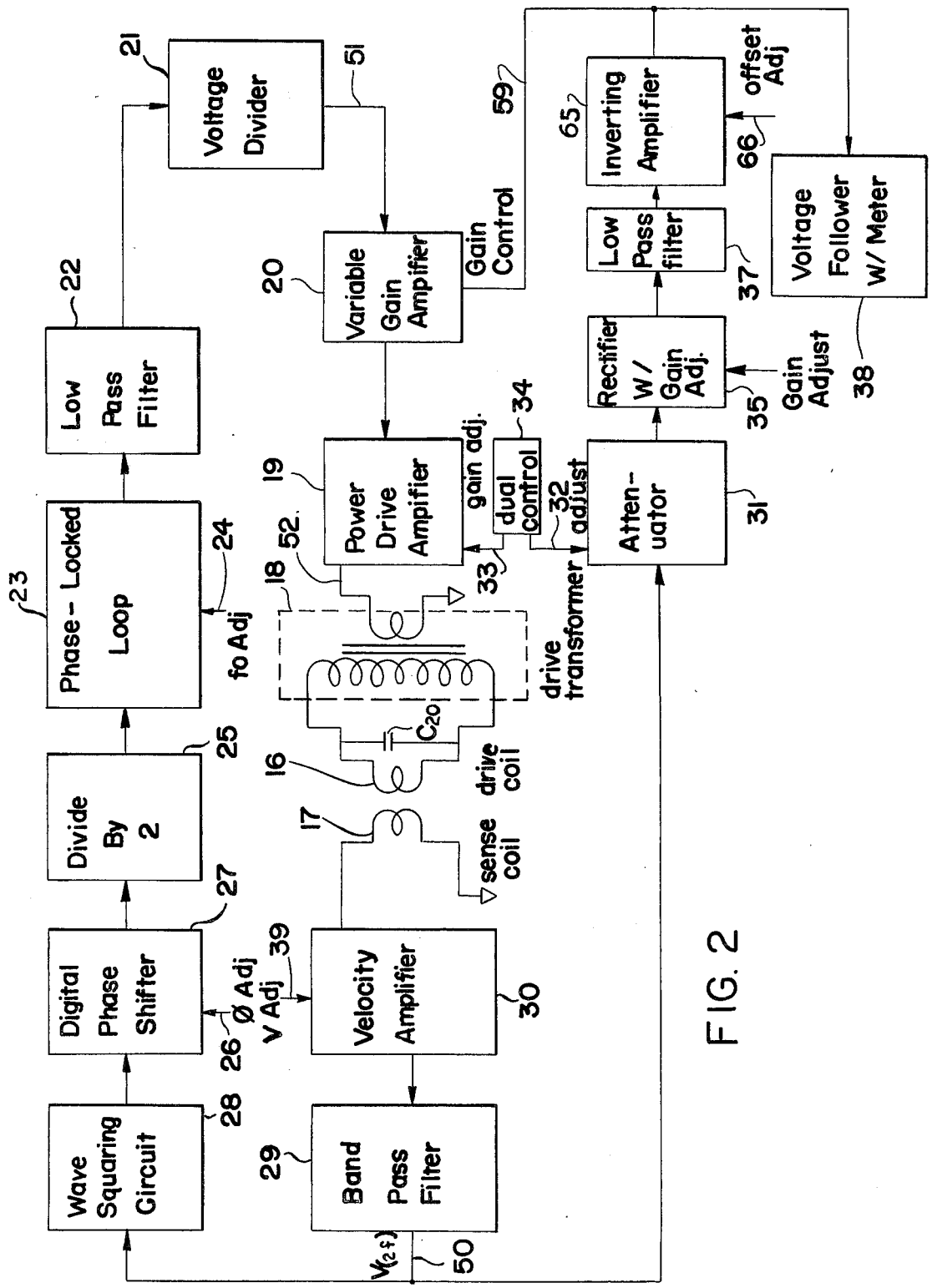
FIG. 2 is a block diagram of the subject control unit.

Referring now to FIG. 2, a simplified block diagram of the control unit may be seen.

The unit is comprised of two closed-loop systems including a first system for controlling the frequency of a drive signal 52 applied to drive coil 16 and a second system for controlling the amplitude of the drive signal 52. As will become apparent, the frequency control loop serves to maintain the frequency of drive signal 52 in coincidence with the changing mechanical resonant frequency of the vibratory feeder, whereas the amplitude control loop serves to maintain a constant amplitude of feeder bowl 10 by monitoring the vibration velocity of feeder bowl 10.

The frequency control loop will first be described. The loop is comprised of drive coil 16 which, as will be described, is provided with a sinusoidal current from a drive transformer 18. As the sinusoidal current moves through drive coil 16 (FIG. 1), an attractive force is generated between the E-core 13A and armature 13B that is proportional to the magnitude of the current, the number of turns of wire in the coil, the magnetic characteristics of 13A and 13B and the length of the air gap between them. The resultant force causes bowl 10 to vibrate at twice the frequency of the current in drive coil 16.

Sense coil 17 is also mounted to the base by way of rod 15. The voltage developed in the coil is proportional to the number of turns of wire in coil 17, the strength of the magnetic field caused by the moving magnets 14 and the velocity at which the coil (bowl) is moving. The frequency of the voltage developed across sense coil 17 is twice that of the voltage applied to drive coil 16. In most applications, the frequency of the drive signal varies from 20 to 75 Hz, therefore the frequency of the voltage developed by coil 17 will range from 40 Hz to 150 Hz.

The phase relationship between the drive voltage applied to drive coil 16 and the voltage induced in coil 17 is most important. As is well-known, the amplitude of vibration of a mass-spring system, such as a vibratory bowl feeder, which is driven by an oscillatory force, such as that provided by drive coil 16, depends upon the resonant frequency of the mechanical system and upon the frequency of the driving force. If the frequency of the driving force differs substantially from the natural frequency of the mechanical system, the amplitude of vibration will be relatively small. If, however, the drive frequency is adjusted to coincide with the resonant frequency of the system, the amplitude of vibration will be at a maximum. At low driving frequencies, the drive force and system displacement are in phase. At driving frequencies much higher than the resonant frequency, the force and system displacement are 180° out of phase. When the frequencies coincide, the phase relationship is 90°. It is this desired 90° phase relationship which the frequency loop seeks to maintain.

Returning to FIG. 2, the frequency loop is further comprised of a velocity amplifier 30 having an input which is connected to sense coil 17. Amplifier 30, which is provided with a gain adjustment 39, amplifies the velocity signal induced in the coil. Amplifier 39 is followed by a bandpass filter which typically has a lower frequency cut-off point of approximately 40 Hz and an upper frequency cut-off point of approximately 150 Hz. The purpose of filter 29 is to reject extraneous signals induced in sense coil 17 which are caused by the mutual inductance between the sense coil 17 and drive coil 16.

The frequency control loop is further comprised of a wave squaring circuit 28 which receives the velocity signal output 50 of filter 29. Circuit 28 converts the sinusoidal velocity signal to an approximately 0 to 5 volt digital signal of the same frequency. The digital signal is then applied to a digital phase shifter 27. Phase shifter 27 includes a phase adjustment 26 which permits the desired degree of phase shift to be manually set.

The phase shifted output of phase shifter 27 is fed to a divide-by-two circuit 25 which halves the frequency of the velocity signal. The frequency of the velocity signal is, therefore, approximately equal to that of the drive signal applied to drive coil 16. The output of the divide-by-two circuit is connected to the input of a conventional phase-locked loop circuit 23. The phase locked loop generates an output, which is typically a triangular wave, which is in phase with the phase-shifted velocity signal applied to the loop input. The output frequency of loop 23 is automatically adjusted to give the desired zero phase relationship between the loop input and output with the loop center frequency $f_o$ being determined by a manual frequency adjustment 24.

The triangular wave output of phase-locked loop 23 is filtered by a lowpass filter 22 resulting in a sinusoidal output signal. The signal is reduced in amplitude by a voltage divider 21. The output 51 of divider 21 is fed to the input of a variable gain amplifier 20. The gain of amplifier 20 is determined by the gain control signal provided on line 59. The gain control signal on line 59 is generated by the amplitude control loop as will be subsequently described.

The final elements of the frequency control loop include a power drive amplifier 19, capable of providing relatively large sinusoidal output currents, and a drive transformer 18 driven by the amplifier. As will be discussed in greater detail below, drive amplifier 19 is provided with a gain adjust 33 controlled by a dual control 34. Transformer 18 receives the sinusoidal output signal from power drive amplifier 19 and steps the voltage up to the desired peak-to-peak value. The high voltage output from transformer 18 is applied to drive coil 16, having a shunt filter capacitor C20, thereby completing the frequency control loop.

The amplitude control loop includes many of the elements of the frequency control loop. Such common elements include variable gain amplifier 20, power drive amplifier 19, drive transformer 18, drive and sense coils 16 and 17, velocity amplifier 30 and bandpass filter 20. The amplitude control loop further includes a variable attenuator 31 which receives the sinusoidal signal output 50, of bandpass filter 29, which has an amplitude that is proportional to the velocity of the vibration of feed 10 (FIG. 1), and therefore, the amplitude of such vibration. Attenuator 31 reduces the amplitude of the signal on output 50 as determined by the setting of an attenuator adjust 32 which is also controlled by dual control 34. The operation of control 34 will be subsequently described.

The amplitude control loop further includes a rectifier 35 which receives the sinusoidal A.C. output of attenuator 31. Rectifier 35 is a precision full-wave rectifier having a gain adjustment means. The output of rectifier 35 is fed to a lowpass filter 37 which removes the A.C. component from the output and develops a D.C. signal having an amplitude which is proportional to the amplitude of the feeder bowl 10 velocity. The D.C. output of filter 37 is fed to an inverting amplifier 65 with an offset adjustment 66. Output 59 of amplifier 65 is connected to the gain control input of variable gain amplifier 20 thereby completing the amplitude control loop. Output line 59 is also connected to a voltage follower and meter circuit 38. As will be described in greater detail, circuit 38 is used for initializing the controller.

Referring now to FIGS. 3-6, the details of the various circuits which make-up the frequency control and amplitude control loops of the vibratory device control unit will be described. Generally, the circuits are of a conventional nature and need not be described in great detail in order to understand, make and use the subject invention.

Figure 3:
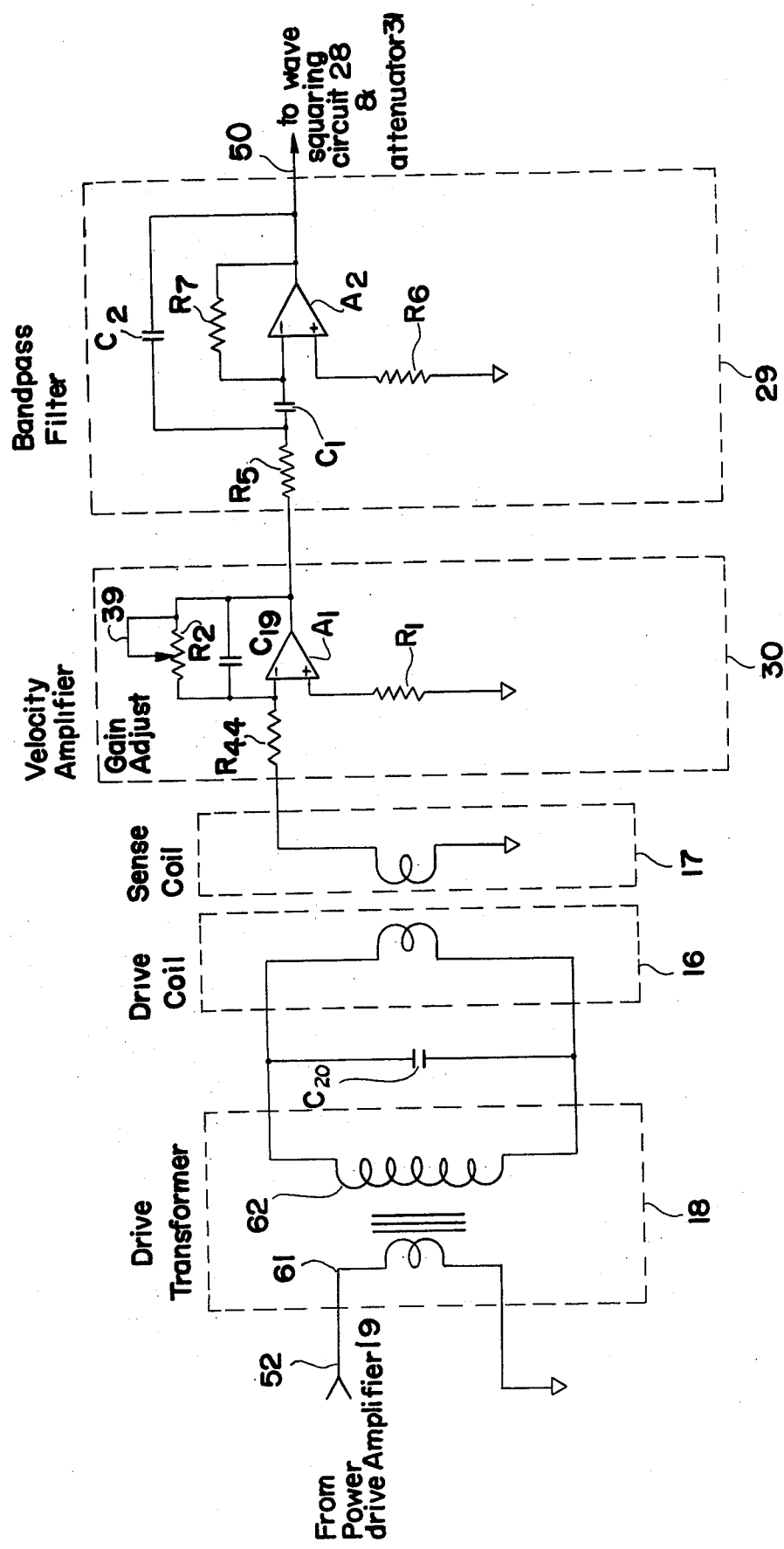
FIG. 3 is a schematic diagram showing some of the circuit details of a preferred embodiment of the invention including those of the drive transformer, the drive and sense coil, velocity amplifier and band pass filter.

FIG. 3 shows the voltage step-up drive transformer 18 having a primary winding 61 and a secondary winding 62. One input of primary 61 is grounded with the remaining input being connected to receive the sinusoidal A.C. output 52 of power drive amplifier 19. The secondary high voltage winding 62 is connected to the drive coil 16 of the vibratory feeder. A filter capacitor C20 is also connected across the secondary winding. Sense coil 17, which detects the movement of the feed bowl 10, has one terminal which is grounded and a second terminal connected to velocity amplifier 30 which amplifies the A.C. velocity signal developed across the coil.

Velocity amplifier 30 is comprised of an operational amplifier A1 having an input resistor R44 connected to the inverting input and a variable feedback resistor R2. Resistor R2 is provided with an adjustment 39 which is used for varying the gain of the velocity amplifier. A phase compensation capacitor C19 is connected across resistor R2 and the non-inverting input of amplifier A1 is connected to ground through resistor R1.

The output of the velocity amplifier 30 is filtered by the bandpass filter 29 which removes the undesireable signals caused by the mutual inductance between the drive and sense coils 16 and 17. Filter 29 is a conventional active filter of the multiple feedback variety. The filter is comprised of operational amplifier A2, associated resistors R5, R6 and R7 and capacitors C1 and C2. The values of such resistors and capacitors are selected in the well-known manner for giving the desired bandpass characteristics.

Figure 4:
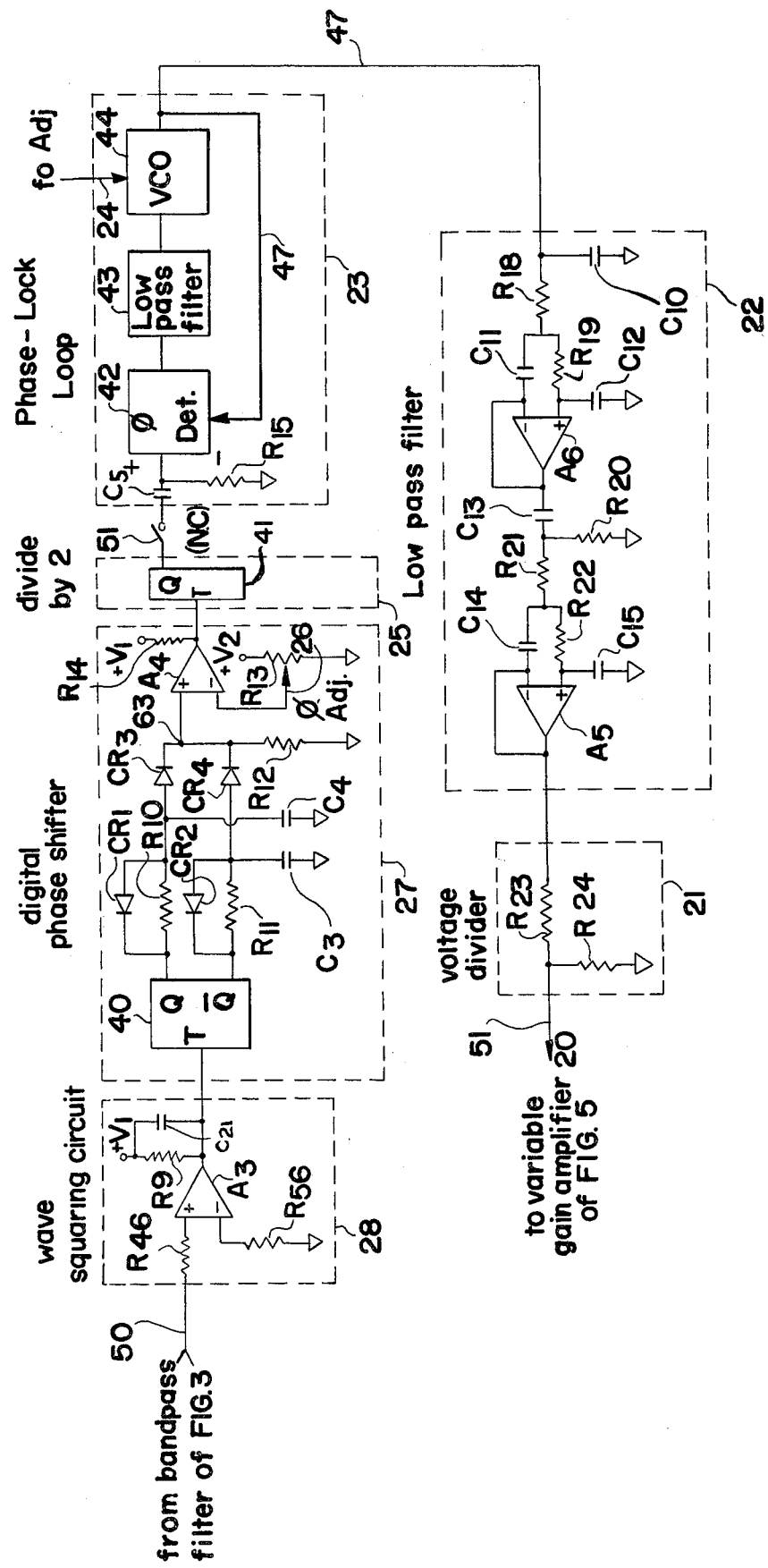
FIG. 4 is a schematic diagram showing some of the circuit details of a preferred embodiment of the invention including those of the digital phase shifter, and phase-locked loop lowpass filter.

Referring now to FIG. 4, the sinusoidal velocity signal at the output 50 of filter 29 is connected to the input of wave squaring circuit 28. Circuit 28 is comprised of a conventional comparator circuit A3 having an input resistor R46 connected to the non-inverting input thereof and a resistor R56 connecting to the inverting input of the comparator to ground. A pull-up network consisting of resistor R9 and parallel capacitor C21 is connected between the output of comparator A3 and power supply voltage V1 which is approximately 5 volts. When the A.C. velocity signal on line 50 is negative, the output of comparator A3 is at 0 volts. When the input signal increases to 0 volts and above, the output switches to approximately 5 volts, thus the A.C. velocity signal is converted to a 0 to 5 volt digital signal of the same frequency.

The digital output of circuit 28 is sent to the digital phase shifting circuit 27. Circuit 27 includes a toggle flip-flop 40 which is clocked by the output signal of the squaring circuit. The Q output of flip-flop 40 is coupled to a series connected R-C network comprising resistor R10 followed by capacitor C4 which has one lead grounded. When the Q output of flip-flop 40 goes positive, capacitor C4 is charged through resistor R10 thereby causing an exponentially increasing waveform to be developed across the capacitor. When the Q output goes low, capacitor C4 is quickly discharged through diode CR1 connected across resistor R10.

A similar R-C network comprising resistor R11, capacitor C3 and diode CR2 is connected to the Q output of flip-flop 40. At node 63, which is connected to ground through resistor R12, the signals developed across capacitors C3 and C4 are "OR'ed together" through respective diodes CR3 and CR4. Thus, the signal at node 63 is comprised of a train of positive pulses, each having exponentially increasing leading edges with the frequency of the pulse train, being equal to that of the velocity signal output of the squaring circuit 28.

The digital phase shifter 27 further includes a comparator A4 having a non-inverting input connected to node 63, an inverting input connected to the wiper 26 of a variable resistor R13 and an output connected to voltage V1 through pull-up resistor R14. One terminal of resistor R13 is connected to a positive supply voltage V2, which is preferably approximately +12 volts, and the other terminal is connected to ground. The threshold or switching voltage of comparator A4 can thus be varied by adjusting the position of wiper 26. By adjusting the switching voltage, the level at which the exponentially increasing leading edges of the signal at node 63 cause comparator A4 to switch can be continuously varied. Thus, the phase of the digital signal produced at the comparator output can also be varied. Voltage V2 should be regulated to ensure a constant phase shift for a given wiper setting (phase adjust) 26.

The frequency of the velocity signal output of phase shifter 27 is halved by the divide-by-two circuit 25. This circuit is comprised of a toggle flip-flop 41 clocked by the phase shifter velocity output. The output of the dividing circuit 25 is then fed to the phase locked-loop 23 by way of a normally closed switch 51 and coupling capacitor C5.

Phase-locked loop 23 includes a phase detector 42 followed by a lowpass filter 43 and a voltage controlled oscillator (VCO) 44 having an output 47 which is fed back to the detector. Detector 42, filter 43 and VCO 44, which are available on a single integrated circuit chip, operate in the conventional manner so as to cause the loop input and loop output signals to be in phase. VCO 44 includes a frequency adjust 24 which permits the center frequency $f_o$ of the loop output to be manually set.

Although it is preferable that the loop input frequency match the loop output, the divide-by-two circuit 25 can be deleted so that the loop is driven directly by the output of the phase shifter 27.

The lowpass filter 22, which filters the triangular-wave shape output 47 of phase-lock loop 23, is a conventional fourth order filter comprised of two series connected individual active filters. The input filter is comprised of operational amplifier A6, associated resistors R18 and R19 and associated capacitors C10–C12. Similarly, the second active filter is comprised of operational amplifier A5, associated resistors R20–R22 and associated capacitors C13–C15. The values of the various resistors and capacitors which make up the two active filters are selected in a manner well-known in the art to give the desired lowpass frequency characteristics.

The voltage divider 21, which receives the sinusoidal output of filter 22, is comprised of input resistor R23 followed by grounded resistor R24. The output 51 of resistive divider 21 is then fed to the input of the variable gain amplifier 20, the details of which will be subsequently described.

Figure 5:
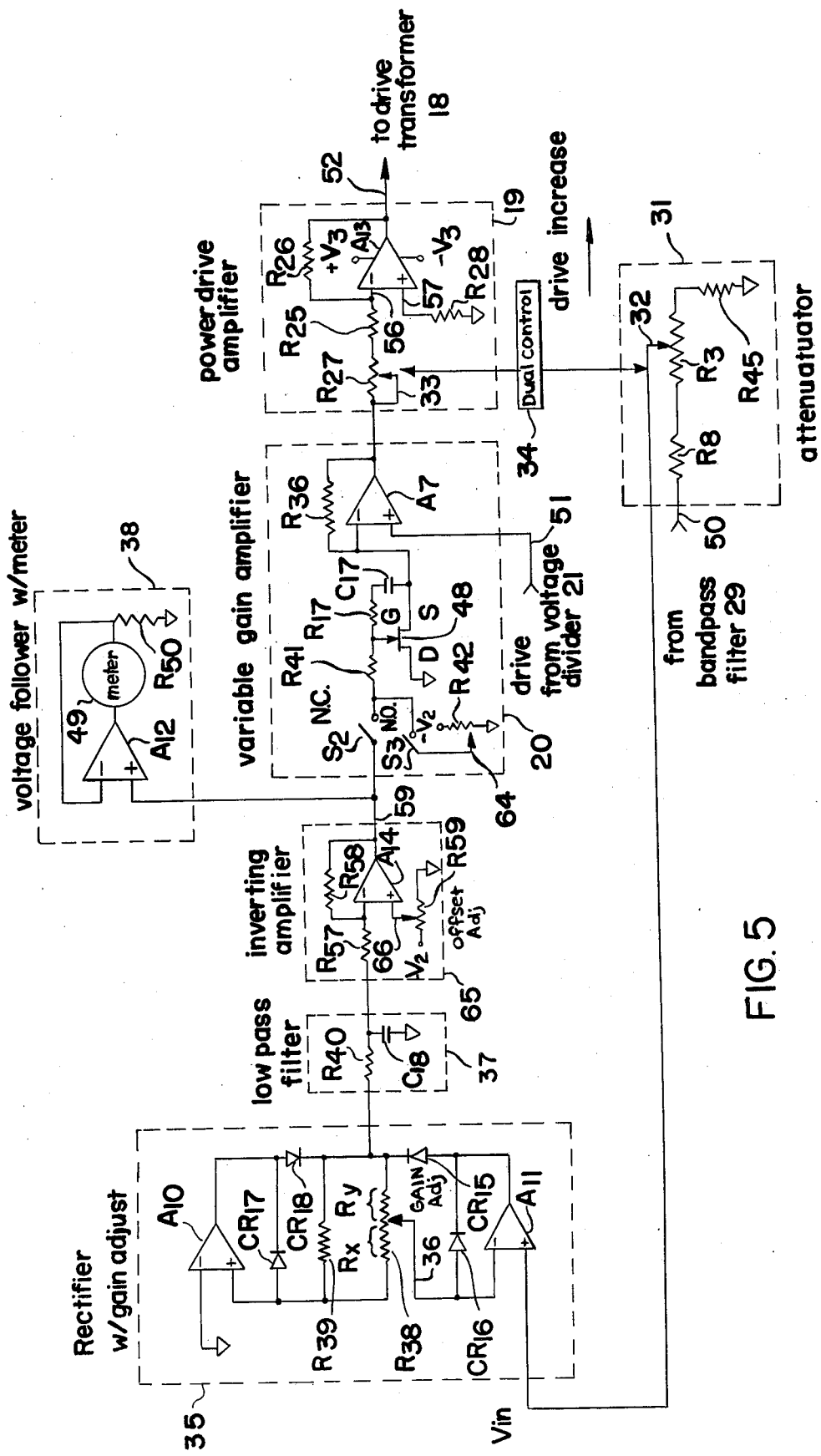
FIG. 5 is a schematic diagram showing some of the circuit details of the subject invention including those of the rectifier, lowpass filter, variable gain amplifier and power amplifier.

Referring now to FIG. 5, the details of attenuator 31, which also receives the velocity signal 50 output of bandpass filter 29, are shown. The attenuator includes an input resistor R8, followed in series by a variable resistor R3 which is, in turn, followed by a grounded resistor R45. The output of the attenuator is connected to the wiper 32 of variable resistor R3 with the position of the wiper being determined by the dual control 34 which will be described below.

The attenuated A.C. sinusoid velocity signal output from attenuator 31 is converted to an equivalent D.C. signal by rectifier 35 followed by lowpass filter 37. Rectifier 35 is a precision full-wave rectifier of conventional design. The rectifier is comprised of a pair of operational amplifiers including an input amplifier A11, which receives the A.C. signal, and a reference amplifier A10. Diodes CR15 and CR16 associated with amplifier A11 and diodes CR17 an CR18 associated with amplifier A10 are also included in the rectifier as are variable resistor R38 and resistor R39.

In operation, amplifier A11 maintains the wiper 36 (gain adjust) of variable resistor R38 at the same voltage as the sinusoidal input voltage ($V_{in}$) from attenuator 31. Similarly, amplifier A10 maintains the negative input of the amplifier and the terminals of resistors R39 and R38 connected thereto at the same potential as the positive input to the amplifier, i.e., at virtual ground. When the rectifier $V_{in}$ input is positive, diode CR16 is reversed biased, hence there is no current flow through wiper 36. The wiper 36 voltage is at $V_{in}$, therefore the rectifier output voltage is equal to $V_{in} \times R38/Rx$ ($Rx + Ry = R38$). The current through resistors R38 and R39 is provided by amplifier A11 through diode CR15. When $V_{in}$ is negative, it can be seen that the current flow through Rx of R38 is $V_{in}/Rx$. Diode CR17 is reversed biased, hence all of such current must be supplied to Rx by amplifier A10 through diode CR18 and resistor R39. The magnitude of the voltage across R39, which is also equal to the rectifier output voltage, is accordingly equal to $V_{in} \times R39/Rx$.

Thus, the amplitude of the rectified output of rectifier 35 is not dependent upon the forward voltage drops of diodes CR15 through CR18 which will vary considerably with temperature. Rather, the magnitude of the output is a function of the amplitude of the input $V_{in}$, the relative values of R38 and R39 and the setting of wiper 36 of R38 which determines the value of Rx. Moreover, a precisely balanced full-wave rectifier 35 output can be achieved by selecting equal values of R38 and R39 with the magnitude of the output voltage dependent upon the value of Rx, i.e., upon the setting of wiper 36.

The full-wave rectified output of rectifier 35 is then filtered by lowpass filter 37 to produce a D.C. signal at the filter output which is proportional to the magnitude of the A.C. velocity signal $V_{in}$. Filter 37 is comprised of a series-connected input resistor R40 followed by a shunt capacitor C18 to ground.

The output of filter 37 is fed to a conventional inverting amplifier 65 which inverts the polarity of the filter output and provides buffering. Amplifier 65 is comprised of operational amplifier A14, input resistor R57 connected to the inverting input and feedback resistor R58. The non-inverting input of amplifier A14 is connected to an offset adjust circuit comprising variable resistor R59. R59 has one terminal connected to supply voltage $-V_2$, which is preferably approximately $-12$ volts, the other terminal connected to ground and the wiper 66 connected to the amplifier input. Supply voltage $-V_2$ should be regulated to ensure that the output 59 of the inverting amplifier is stable.

The voltage follower and meter circuit 38 is used, as will be subsequently described, for initializing the subject control unit. Circuit 38, which receives the output 59 of amplifier 65, is comprised of unity gain-configured operational amplifier A12, meter 49 connected between the amplifier output and the amplifier feedback loop. Also included is a resistor R50 having one terminal connected to ground and the other connected to the amplifier feedback loop. It can be seen that current through meter 49 is equal to the magnitude of the voltage at output 59 divided by the value of resistor R50, thus the meter can be used to indicate the magnitude of the D.C. velocity signal.

Variable gain amplifier 20 also receives the D.C. velocity signal on line 59. The D.C. signal is used to control the gain of variable gain amplifier 20 which amplifies the sinusoidal drive signal 51. Variable gain amplifier 20 is comprised of operational amplifier A7, the non-inverting input of which receives drive signal 51. A feedback resistor R36 is connected between the output and the inverting input of amplifier A7. Also connected to the inverting amplifier input is the source of a field effect transistor (FET) 48. The drain of FET 48 is connected to ground with the gate being connected to the velocity signal on line 59 by way of resistor R41 and normally closed switch 52. A high impedance resistor R17 and a capacitor C17 are connected in series between the gate and source of FET 48.

The velocity signal on line 59 controls the FET 48 gate voltage and, therefore, the effective resistance between ground and the inverting input of amplifier A7. When the effective resistance of FET 48 is increased by an increase in velocity signal magnitude, the total amount of amplifier A7 feedback is increased thereby reducing the overall closed-loop gain of the variable gain amplifier 20. Similarly, a decrease in FET resistance caused by a reduction in velocity signal amplitude will decrease the amount of feedback so as to increase the amplifier closed-loop gain. Thus, the gain of amplifier 20 changes to compensate for changes in the magnitude of the velocity signal.

The normally closed switch S2 of the variable gain amplifier 20 is used for initializing the control circuit. A second switch S3, which is normally open, is also used in the initialization process. Switch S3 has one terminal connected to resistor R41 and the other terminal connected to the wiper 64 of a variable resistor R42. Variable resistor R42 is connected between the negative power supply voltage V2, which is preferably approximately $-12$ volts, and ground. The operation of switches S2 and S3 will be discussed subsequently.

The amplified drive signal output of variable gain amplifier 20 is further amplified by power drive amplifier 19. Amplifier 19 is comprised of power amplifier A13, feedback resistor R26 and series-connected input resistors R27 and R25 connected to the inverting input 56 of the amplifier. Resistor R28 is connected between the non-inverting input 57 of amplifier A13 and ground.

Resistor R27 is a variable resistor having a wiper 33. The position of wiper 33, along with the position of wiper 32 of variable resistor R3 of attenuator 31 is controlled by the manual dual control 34 which is used to control the drive level and, thus, the amplitude of feeder bowl vibration. Variable resistors R27 and R3 are typically a gang of potentiometers driven by a common drive shaft which serves as dual control 34. The purpose of variable resistors R27 and R3 and control 34 is to maintain a relatively constant FET 48 gate voltage at output 59 over a wide range of drive levels at output 52 of the power drive amplifier. When the dual control 34 is advanced in the direction shown in FIG. 5 to increase the drive level, wiper 33 is shifted so as to reduce the series resistance of resistor R27 thereby increasing the gain of power amplifier 19. At the same time, dual control 34 causes wiper 32 of attenuator 31 to shift in a direction which tends to reduce the level of the velocity signal fed to rectifier 35 thereby compensating for the increase in bandpass filter 29 output on line 50 caused by the increased amplitude of vibration and velocity of feeder bowl 10. Accordingly, the voltage level at line 59 remains constant. When the dual control 34 is used to reduce the amplitude of bowl vibration, the resultant decrease in power drive amplifier 19 gain is offset by an increase in attenuator output voltage, thereby maintaining the desired relatively constant FET 48 gate drive level at line 59.

The details of the power amplifier A13 of the power drive amplifier 19 may be seen in FIG. 6. Amplifier A13, which is of conventional design, is comprised of operational amplifier A8 followed by a high current emitter-follower output stage capable of supplying two polarities of output current. The positive current (current driving) half of the output stage is comprised on NPN transistors $Q_1$ and $Q_2$, which are connected together as a Darlington pair, associated emitter resistors R51 and R52 bias resistors R30 and R32, output resistor R34 and bias diodes CR5 and CR6. Diodes CR9, CR10 and CR11 provide output current limiting. The negative current (current sinking) half of the output stage is comprised of PNP transistors $Q_3$ and $Q_4$, which are also connected together as a Darlington pair, associated emitter resistors R53 and R54, bias resistors R31 and R33 and bias diodes CR7 and CR8. Diodes CR12, CR13 and CR14 provide input current limiting. Positive feedback is provided by capacitor C16 which connects the output of the output stage to the input.

The power drive amplifier is powered by plus and minus supply voltages $+V_3$ and $-V_3$ which need not be regulated but which should be capable of providing relatively high current. The supply voltages are typically ±38 volts. The output stage is preferably biased at class A-B by resistors R30–R33 and diodes CR5–CR8 so that at zero input, a small quiescent current flows through NPN transistors $Q_1$ and $Q_2$, output resistors R34 and R35 and PNP transistors $Q_3$ and $Q_4$. When the input voltage to the output stage goes positive, transistors $Q_3$ and $Q_4$ are off with the output current being provided by transistors $Q_1$ and $Q_2$. At high output currents, the increased voltage drop across output resistor R34 and the increased base-emitter voltages of $Q_1$ and $Q_2$ cause diodes CR9, CR10 and CR11 to forward bias thereby limiting the base drive to the transistors and thus, the output current. When the input voltage to the output stage goes negative, transistors $Q_1$ and $Q_2$ are cut off with transistor $Q_3$ and $Q_4$ sinking the input current. At high input currents, the increased voltage drop across R35 and the increased base-emitter voltages of transistors $Q_3$ and $Q_4$ cause diodes CR12–CR14 to become forward biased thereby limiting the base drive to the output transistors. Accordingly, the input current of the output stage is also limited.

Having described the construction of a preferred embodiment of the subject vibratory controller, operation of the controller will be very briefly described. The system, including the vibratory feeder and the subject control unit, can be easily set up or initialized. First, the feeder bowl 10 is loaded to approximately half capacity with product. Initialization switch 51 (FIG. 4) is then opened thereby grounding the phase-locked loop input through resistor R15. Next, the amplitude control loop is interrupted by opening switch S2 (FIG. 5). Switch S3 is then closed thereby providing variable gain amplifier 20 with a fixed value control voltage. The frequency output of phase-locked loop 23 is then adjusted using loop frequency adjustment 24 until the frequency of the drive signal coincides with the resonant frequency of the vibratory feeder. The loop frequency is at resonance when the amplitude of feeder bowl vibration is at a maximum as indicated by meter 49.

Once the center frequency of the phase-locked loop 23 is set, the frequency loop is closed by closing switch 51. This will probably cause loop 23 to shift from resonance. Next, the digital phase shifter (FIG. 4) is adjusted using $\phi$ adjustment 26 until the phase relationship between the feeder driving force and the feeder bowl 10 displacement are at 90°, i.e., until the frequency of the drive signal again coincides with the resonant frequency of the feeder. Meter 49 is again used to determine when the system is at resonance. Finally, switch S3 is opened and switch S2 is closed thereby closing the amplitude control loop and completing the initialization process. The feed rate may then be adjusted as required using dual control 34.

Once the feed rate is set, no further adjustment need be made. Any change in drive frequency will result in a phase shift in the velocity signal which will be immediately sensed and corrected by the phase-locked loop 23 of the frequency control loop. Similarly, any change in drive level will cause a change in feed bowl 10 loading or the like will be sensed and corrected by the variable gain amplifier 20 of the amplitude control loop.

Figure 7:
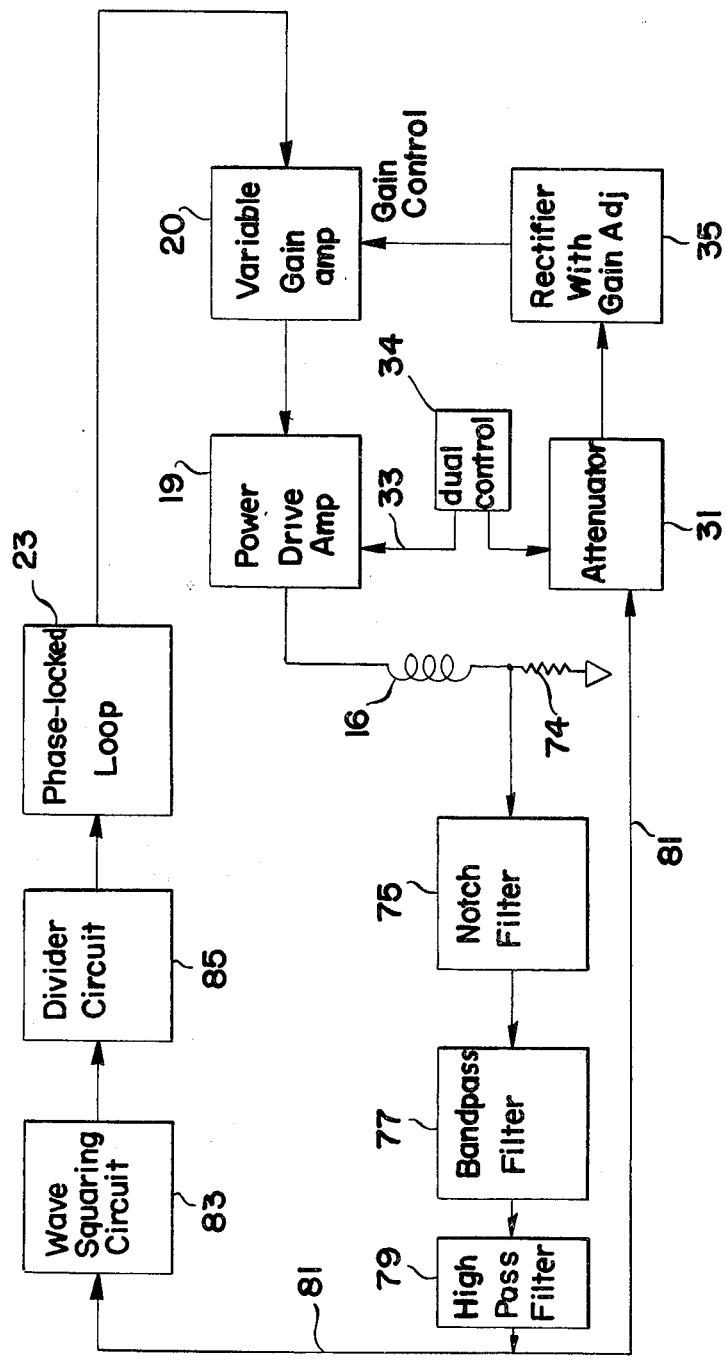
FIG. 7 is a block diagram of an alternate preferred embodiment of the subject control unit.

FIG. 7 illustrates an alternate preferred embodiment detecting movement of the vibrating feeder unit. The detection of the vibrating feeder movement in this embodiment is based on monitoring and detecting a characteristic of the electromagnetic drive current itself. The difference in the circuitry of FIG. 7 and that shown in FIG. 2 are directed towards this end. The differences are in the notch filter 75, bandpass filter 77 and highpass filter 79, and to a lesser degree, in the wave squaring circuit 83 and the divider circuit 85.

The current in the electromagnetic drive coil 16 of the vibrating feeder unit can be measured by measuring the voltage drop across a low-value resistor 74 (about 0.3 ohms). It is a well-known theoretical law that the current in an electromagnetic coil, at constant voltage, varies with variations in the air gap. It is known that the magnetizing current in a coil contains a pronounced third harmonic. By detecting the third harmonic of the drive current signal in the drive coil, it becomes possible to derive a signal that is proportional to the frequency and amplitude of vibration of the vibrating feeder unit.

This is preferably accomplished in the following manner. A notch filter 75 receives an indication of the current in the drive coil 16. The notch filter is set at a central frequency that is equal to the drive frequency. The notch filter removes nearly all of the basic sine wave signal of the drive frequency, and passes the third harmonic. The output of the notch filter 75 is supplied to a bandpass filter 77. The limits of the bandpass filter are to eliminate the drive frequency waveform at high levels of movement. The bandpass filter 77, therefore, removes any residual drive frequency in the sense signal. The bandpass filter 77 may also include a gain amplifier to improve the signal strength of the third harmonic of the drive signal that is being sensed. The output of the bandpass filter 77 is supplied to a highpass filter 79 to remove any D.C. offset that may be present. The output of the high pass filter 79 is then supplied to the attenuator 31 and from there to the rectifier 35. The output of the rectifier 35 is supplied to amplifier 20 to control its output as has been previously described.

The advantage of this particular embodiment is that it eliminates the need for an independent sensor on the moving part of the vibrator, thereby eliminating an additional cost, and eliminating the need to modify the feeder unit.

The output of the high pass filter 79, which is the third harmonic of the drive signal is also indicative of the frequency of vibration of the vibratory unit. This signal is supplied on line 81 to a wave squaring circuit 83 and from there to a divider circuit 85 that provides it to phase-locked loop 23 where it is utilized as previously described. The output of the phase-locked loop 23 is supplied to the variable gain amplifier 29.

Figure 8:
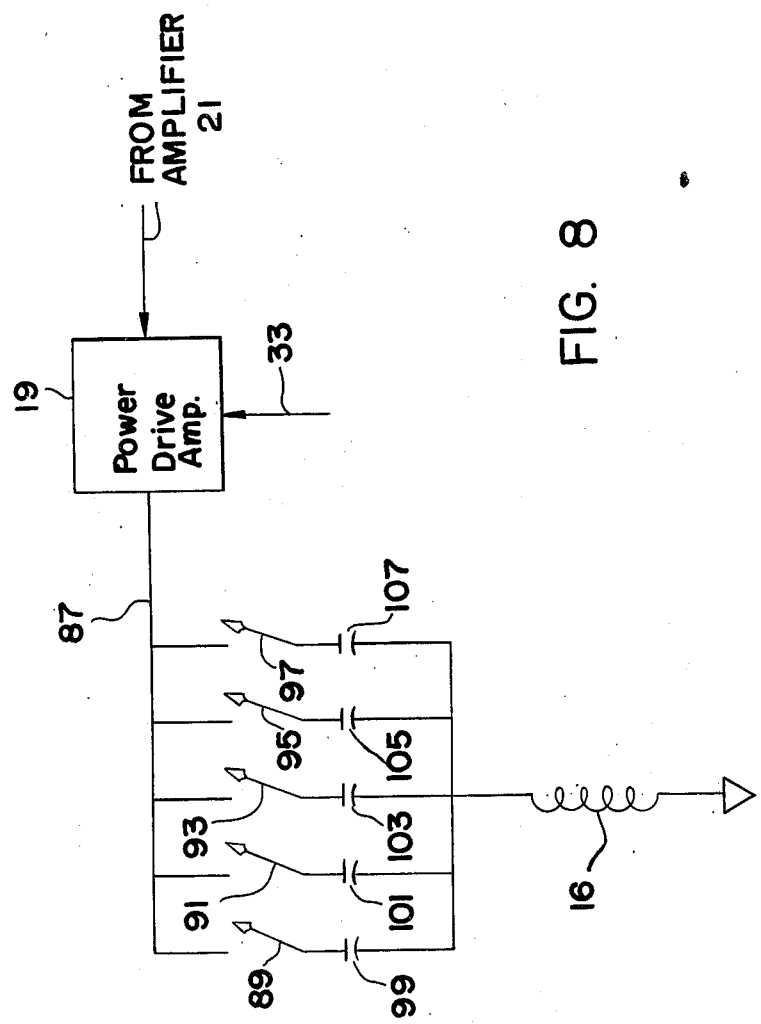
FIG. 8 is a simplified schematic diagram of a preferred coupling circuit at the output of the drive amplifier of the controller.

FIG. 8 illustrates an alternate preferred coupling circuit between the power drive amplifier 19 of the controller of FIG. 2 and the driving coil 16. The coupling circuit comprises a plurality of parallel capacitors 99, 101, 103, 105, 107 which are connected to the output 87 of the power drive amplifier 19, through switches 89, 91, 93, 95 and 97. The parallel bank of capacitors is connected serially to the drive coil 16.

By opening and closing the switches 89, 91, 93, 95 and 97, the capacitive reactance of the coupling circuit is selected to match the inductive reactance of the electromagnetic coil 16. By doing this, the output circuit of the power drive amplifier is in series resonance with the coil 16, with the result that the amplifier only has to overcome the resistance of the coil itself, which is usually only a few ohms.

By providing a plurality of switches with capacitors of different magnitudes, as shown, the switches can be positioned to give the maximum current in the electromagnetic drive coil 16, this indicates that the reactances are balanced.

The advantage of this coupling circuit is that an expensive step-up transformer is not needed, and an output of 21 volts A.C. from power amplifier 19 can drive a 230 volt A.C. electromagnetic drive coil 16.

Thus, a novel control unit for use with a vibratory feeder or the like has been disclosed. The control unit ensures a constant product feed rate despite changes in line frequency, line voltage, and temperature. Once the unit has been set up initially, no further attention from the operator is required to maintain the desired feed rate. While a preferred embodiment of the control unit has been disclosed, it is to be appreciated that various modifications may be made without departing from the spirit and scope of the invention as defined by the appended claims. By way of example, voltage controlled oscillator 44 (FIG. 4) could be responsive to the amplitude of the velocity signal rather than the phase of such signal. For a given dual control setting, the output frequency of oscillator 44 would watch the mechanical resonant frequency of the feeder system when the velocity signal reached a maximum amplitude.

What is claimed is:

1. In a vibratory feeder system for delivering product at a predetermined rate including a vibratory feeder having a platform for receiving a product dispensing receptical and an electromagnetic driver unit for imparting reciprocal vibratory movement to said platform, an improved control unit therein comprising:
sensing means for sensing the third harmonic of the drive current signal in the electromagnetic driver unit;
amplitude control means responsive to said third harmonic signal for determining whether said amplitude of said vibratory movement of said platform corresponds to a desired predetermined vibratory amplitude;
frequency control means responsive to said third harmonic signal for determining whether said frequency of said vibratory movement of said platform corresponds to a mechanical resonant frequency of said vibratory feeder; and
driving means responsive to said amplitude control means and to said frequency control means for providing said driving signal at an amplitude and frequency such that said amplitude and frequency of said vibratory movement corresponds to said desired predetermined amplitude and said resonant frequency, respectively.

2. The improvement of claim 1 wherein said driving means comprises a variable gain amplifier having a gain control input responsive to said amplitude control means and an amplifier input responsive to said frequency control means.

3. The improvement of claim 2 wherein said driving means further comprises a power amplifier driven by an output of said variable gain amplifier.

4. The improvement of claim 3 wherein said driving means further comprises a voltage step-up transformer having a primary winding coupled to an output of said power amplifier and a secondary winding coupled to said electromechanical driver unit.

5. The improvement of claim 1 wherein said amplitude control means comprises converting means for converting said third harmonic signal to a D.C. signal which is coupled to said driving means.

6. The improvement of claim 5 further comprising level control means for maintaining said D.C. signal of said amplitude control means at an approximately constant level over a range of said platform vibratory amplitudes.

7. The improvement of claim 1 wherein said frequency control means comprises phase detecting means for comparing a phase of said third harmonic signal and a phase of said driving signal.

8. The improvement of claim 7 wherein said frequency control means further comprises a variable frequency oscillator responsive to an output of said phase detecting means.

9. The improvement of claim 8 wherein said phase detector means and said variable frequency oscillator are configured to form a phase-locked loop.

10. In a vibratory feeder system for delivering product at a predetermined rate including a vibratory feeder having a platform for receiving a product dispensing receptical and an electromechanical driver unit for imparting reciprocal vibratory motion to said platform, an improved control unit comprising:
sensing means for sensing the third harmonic frequency of the drive current signal in the electromagnetic driver unit;
oscillating means responsive to said third harmonic signal for generating an oscillating signal having a frequency which corresponds to the mechanical resonant frequency of said vibratory feeder;
amplitude select means for selecting a desired predetermined amplitude of platform vibration; and
variable gain amplifier means for amplifying said oscillating signal at a gain determined by said amplitude of said third harmonic signal and by said amplitude select means so as to generate said drive signal at a frequency and amplitude which correspond to said resonant frequency and said desired predetermined amplitude, respectively.

11. The improvement of claim 10 wherein said variable gain amplifier means comprises a variable gain amplifier and wherein said improvement further comprises a rectifier followed by a lowpass filter which converts said third harmonic signal to a D.C. signal having an amplitude which is proportional to the amplitude of platform vibration, said D.C. signal being coupled to a gain control of said variable gain amplifier.

12. The improvement fo claim 11 wherein said variable gain amplifier means further comprises a power amplifier driven by said variable gain amplifier and wherein said improvement further comprises a level control means for maintaining said D.C. signal at an approximately constant level over a range of said platform vibratory amplitudes.

13. In a vibratory system including a vibrating body having an electromagnetic driver unit for imparting vibratory movement thereto, an improved control unit comprising:
means for sensing the third harmonic frequency fo the drive current signal in said electromagnetic driver unit; and driving means responsive to the sensed third harmonic signal for providing a driving signal to said electromagnetic driver unit at an amplitude corresponding to a desired predetermined amplitude.

14. The improvement of claim 13 wherein said sensing means comprises:
  a notch filter means having its center frequency set at the drive frequency for removing the drive current signal; and
  a bandpass filter means having its center frequency set at three times the driver frequency, for receiving the output of the notch filter and passing the third harmonic of the drive current signal.

15. The improvement of claim 14, further comprising a highpass filter receiving the output of said bandpass filter means, for removing any D.c. offset that may be present.

16. The improved vibratory feeder system of claim 13 further comprising:
  frequency control means responsive to the sensed third harmonic signal for determining whether the frequency of the vibratory movement corresponds to the mechanical resonant frequency of said vibratory feeder; and
  said driving means also being responsive to said frequency control means for providing the drive signal at said mechanical resonant frequency.

17. In a vibratory feeder system for delivering product at a predetermined rate including a vibratory feeder having an electromagnetic driver unit for imparting vibratory movement an improved control unit comprising:
  means for sensing the third harmonic frequency of the drive current signal in the electromagnetic drive unit;
  driving means responsive to said sensed third harmonic for providing a driving signal to the electromagnetic driver unit; and
  a capacitive reactance means connected in series with the electromagnetic driver unit for receiving the driving signal from said driving means, whereby the capacitive reactance is set to be equal to the inductive reactance of the driver unit.

18. The improvement of claim 17, further comprising:
  frequency control means responsive to the sensed third harmonic signal for determining whether the frequency of the vibratory movement corresponds to the mechanical resonant frequency of said vibratory feeder; and
  said driving means also being responsive to said frequency control means for providing the drive signal at said mechanical resonant frequency.

19. In a system including a vibrating body and an electromagnetic driver unit for imparting vibrating motion thereto, an improved means for sensing the vibratory movement of said body, comprising:
  means for sensing the current signal in said electromagnetic driver unit; and
  means for isolating the third harmonic frequency of said sensed current signal.

20. The improved means of claim 19 wherein said isolating means comprises:
  a notch filter means having its center frequency set at the drive frequency for removing the drive current signal; and
  a bandpass filter means having its center frequency set at three times the drive frequency, for receiving the output of the notch filter and passing the third harmonic of the drive current signal.

21. The improved means of claim 20 further comprising a highpass filter means receiving the output of said bandpass filter means for removing any D.C. offset that may be present.

* * * * *